(12) United States Patent
Kuo

(10) Patent No.: US 7,181,809 B1
(45) Date of Patent: Feb. 27, 2007

(54) STRETCH CORD HOOK

(76) Inventor: Su-Min Kuo, No. 18, Lane 29, Yu Nung Rd., Tainan (TW)

(*) Notice: Subject to any disclaimer, the term of this patent is extended or adjusted under 35 U.S.C. 154(b) by 0 days.

(21) Appl. No.: 11/362,854

(22) Filed: Feb. 28, 2006

(51) Int. Cl.
*A44B 13/00* (2006.01)

(52) U.S. Cl. .............. 24/300; 24/598.4; 24/265 H; 24/369

(58) Field of Classification Search .......... 24/592.1, 24/598.4, 18, 68 CD, 300, 301, 302, 265 H, 24/716, 318, 343, 369, 601.2, 71 TD, 265 CD; 223/85, DIG. 4; 248/692, 691
See application file for complete search history.

(56) References Cited

U.S. PATENT DOCUMENTS

| | | | | |
|---|---|---|---|---|
| 5,035,558 A | * | 7/1991 | Prosen | 410/96 |
| D345,297 S | * | 3/1994 | Kraine | D8/367 |
| 5,383,259 A | * | 1/1995 | McIntire | 24/300 |
| 5,423,108 A | * | 6/1995 | Brennan | 24/134 R |
| 5,598,956 A | * | 2/1997 | Schenberg | 223/1 |
| 6,014,794 A | * | 1/2000 | Mc Coy | 24/300 |
| 6,032,338 A | * | 3/2000 | Birks | 24/114.5 |

* cited by examiner

*Primary Examiner*—Robert J. Sandy
*Assistant Examiner*—Marcus Menezes
(74) *Attorney, Agent, or Firm*—Rosenberg, Klein & Lee

(57) ABSTRACT

A stretch cord hook includes hook members, connecting blocks and an elastic cord. The elastic cord has its ends secured to the connecting blocks, respectively. Each connecting block is integrally formed with a respective hook member. Each hook member has an inner surface provided with protuberances spaced from each other to prevent it from disengagement.

3 Claims, 7 Drawing Sheets

STRETCH CORD HOOK

BACKGROUND OF THE INVENTION

1. Field of the Invention

This invention relates to a stretch cord hook, and more particularly to a hook member having an inner surface provided with protuberances spaced from each other to prevent the hook from disengagement.

2. Description of the Prior Art

A conventional stretch cord hook has an open end. The inner surface of the hook is a circular and smooth surface. The hook is used to engage with a truck's body. When the truck is in driving on a rough road, any bumping will cause the hook to slide due to its smooth surface. Sometimes, the hook may disengage from the truck.

SUMMARY OF THE INVENTION

It is the primary object of the present invention to provide a stretch cord hook, which is formed with protuberances for the hook to engage with the truck body securely.

It is another object of the present invention to provide a stretch cord hook, which provides anti-slip strips on two sides of a connecting block for the user to grasp easily.

It is a further object of the present invention to provide a stretch cord hook, which has protuberances each formed with a lower portion and an enlarged head to provide a better grasping force.

DETAILED DESCRIPTION OF THE PREFERRED EMBODIMENTS

Figure 1:
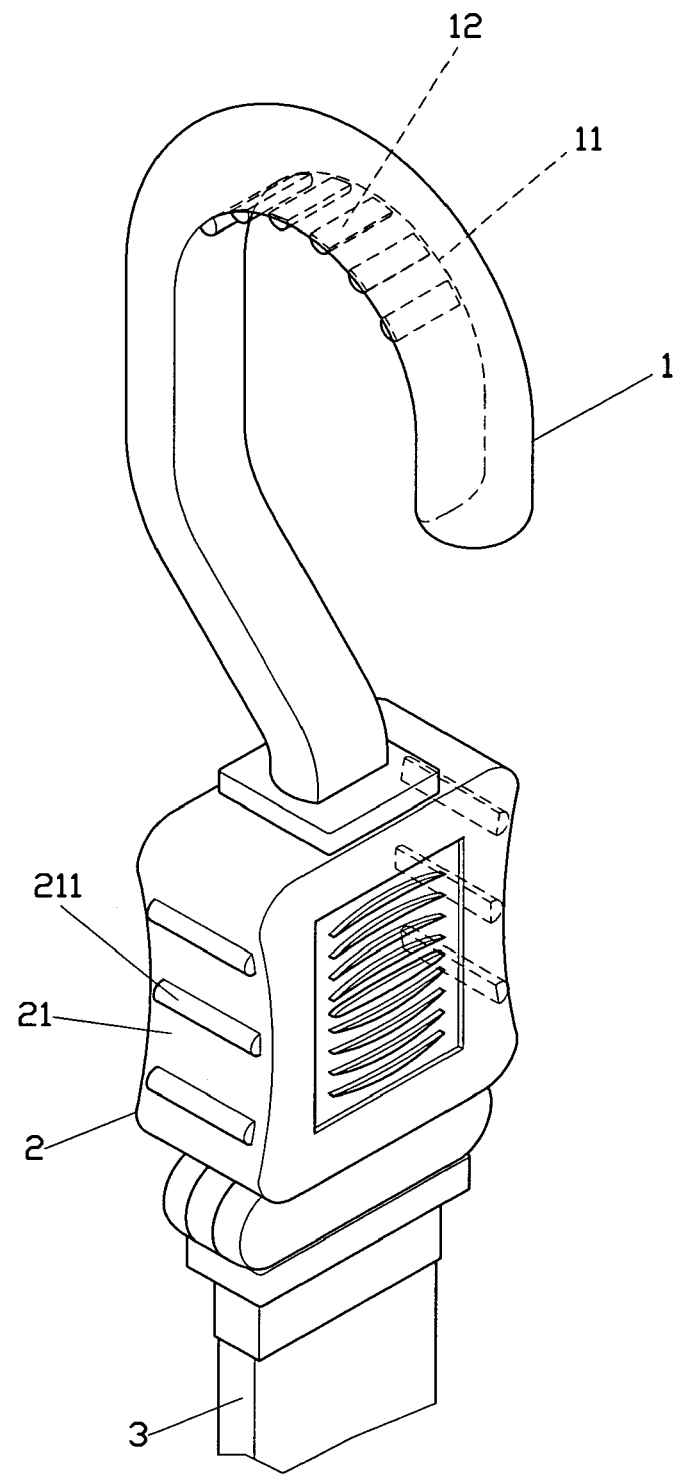
FIG. 1 is a perspective view of a first preferred embodiment of the present invention.
Figure 2:
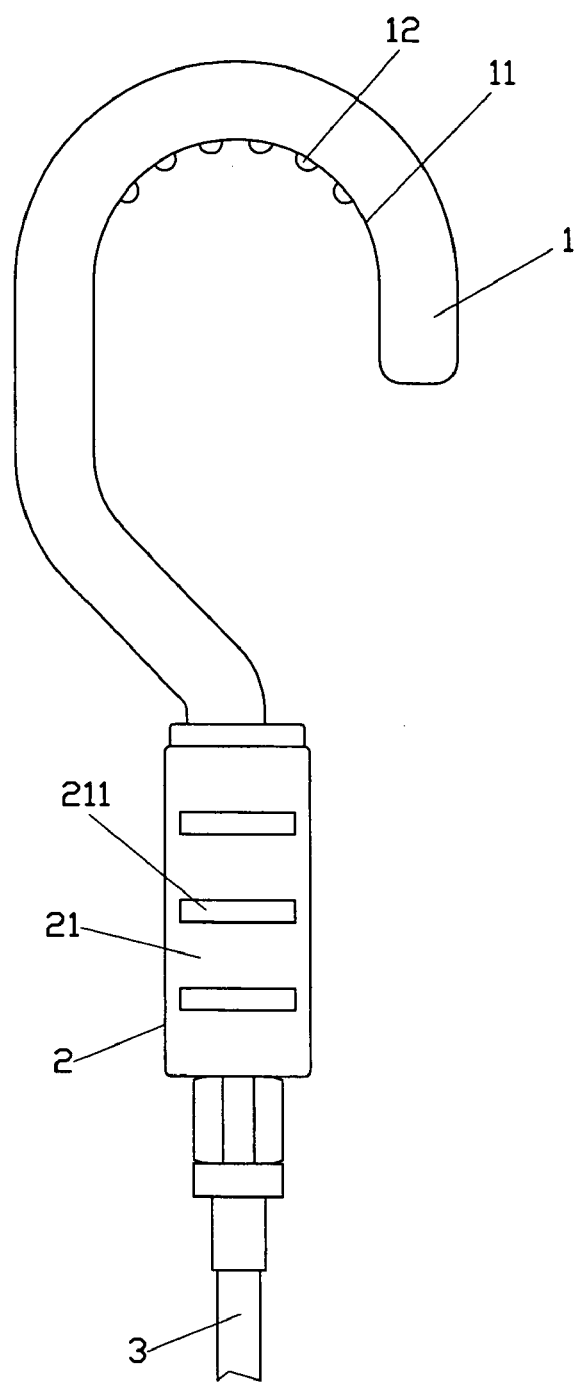
FIG. 2 is a side view of the first preferred embodiment of the present invention.

As shown in FIGS. 1 and 2, the present invention comprises hook members 1, connecting blocks 2, and an elastic cord 3. The cord 3 has its two ends secured to the connecting blocks 2, respectively. Each connecting block 2 is integrally formed with a respective hook member 1.

Each hook member 1 has a flat inner surface 11. The inner surface 11 is formed with protuberances 12 spaced from each other. Each connecting block 2 has two concave sides 21. Each concave side 21 is formed with anti-slip strips 211.

Figure 3:
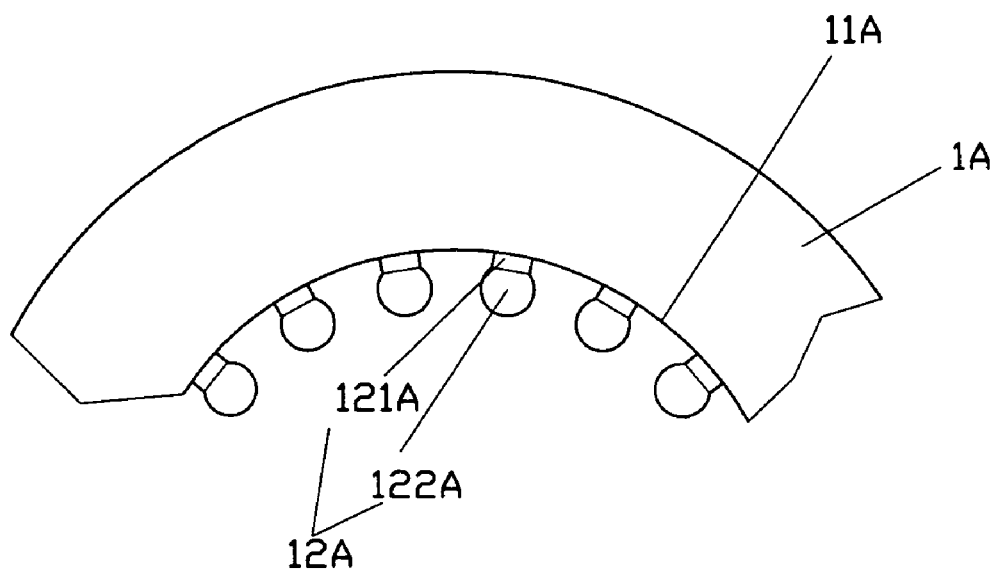
FIG. 3 is an enlarged view of a second embodiment of the present invention.

Another embodiment of the present invention, as shown in FIG. 3, comprises hook members 1A. The inner surface 11A of each hook member 1A is formed with protuberances 12A spaced from each other. The protuberance 12A is formed with a lower portion 121A and an enlarged head 122A extending from the lower portion 121A, which is easy to grasp any object.

Figure 4:
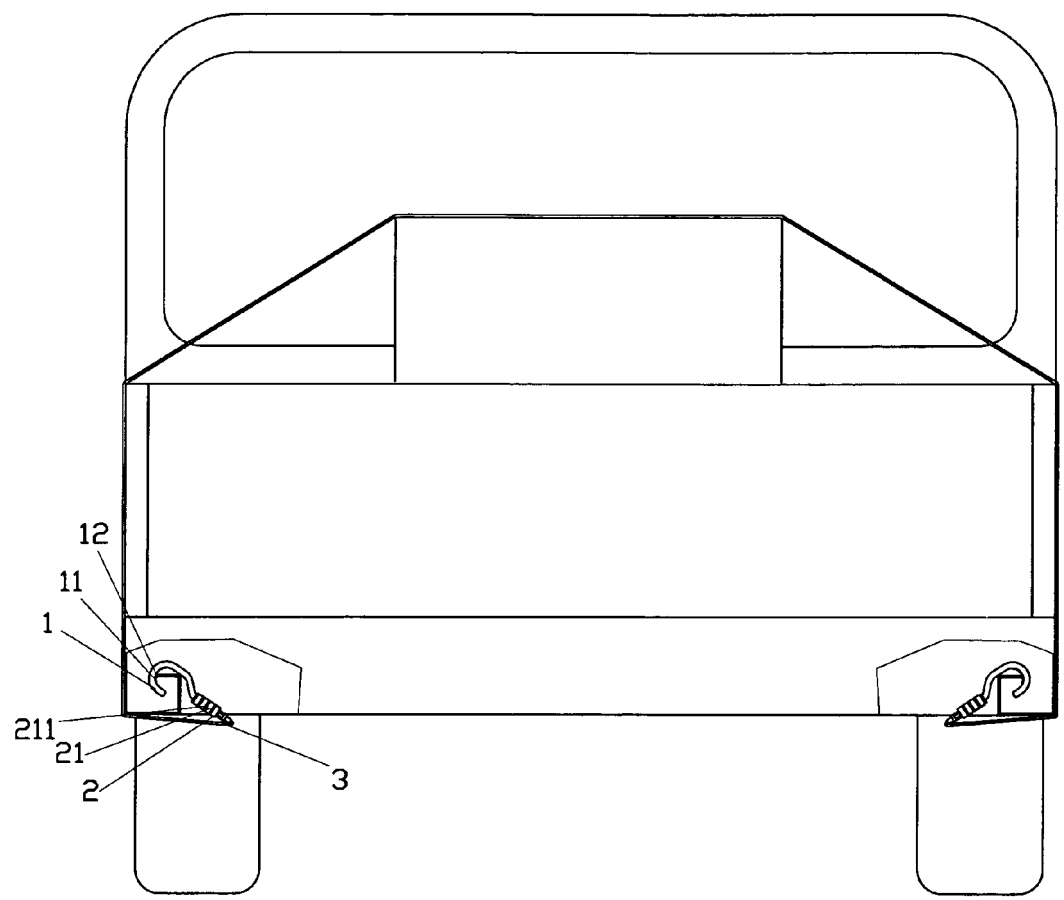
FIG. 4 is a schematic view showing the first embodiment of the present invention in an operation status.
Figure 5:
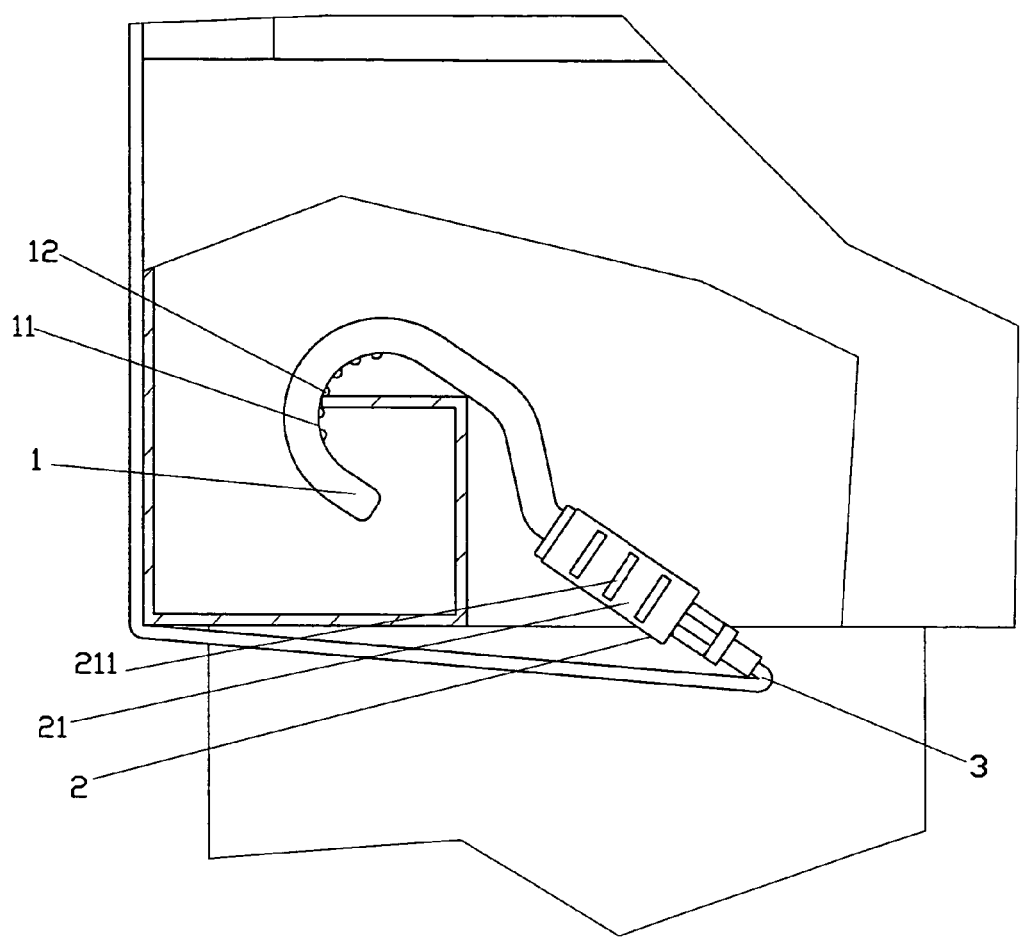
FIG. 5 is an enlarged view of FIG. 4.

To practice the present invention, as shown in FIGS. 4 and 5, the hook members 1 are linked to a truck's body. The protuberances 12 on the inner surface 11 grasp the truck's body, preventing the hook member 1 from disengagement. The two sides 21 of the connecting block 2 are adapted to grasp easily. The anti-slip strips 211 prevent the user's fingers from slipping.

Figure 6:
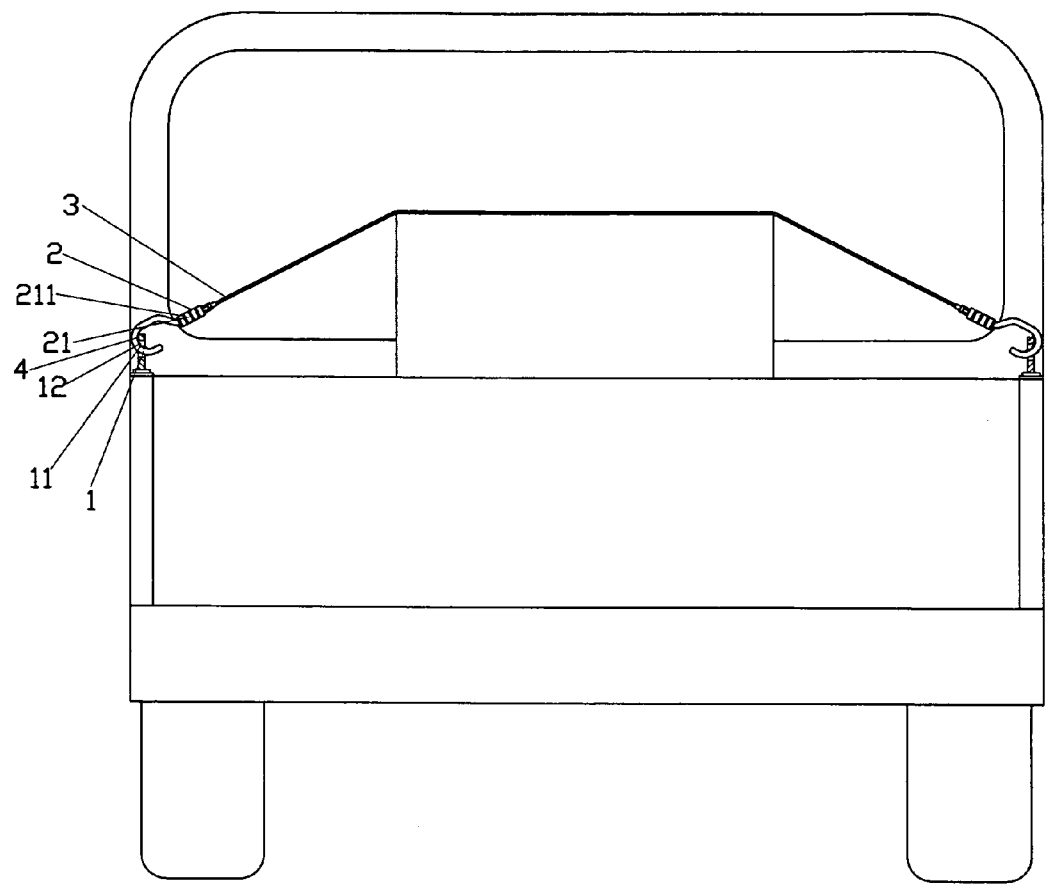
FIG. 6 is a schematic view showing the first embodiment of the present invention in another operation status.
Figure 7:
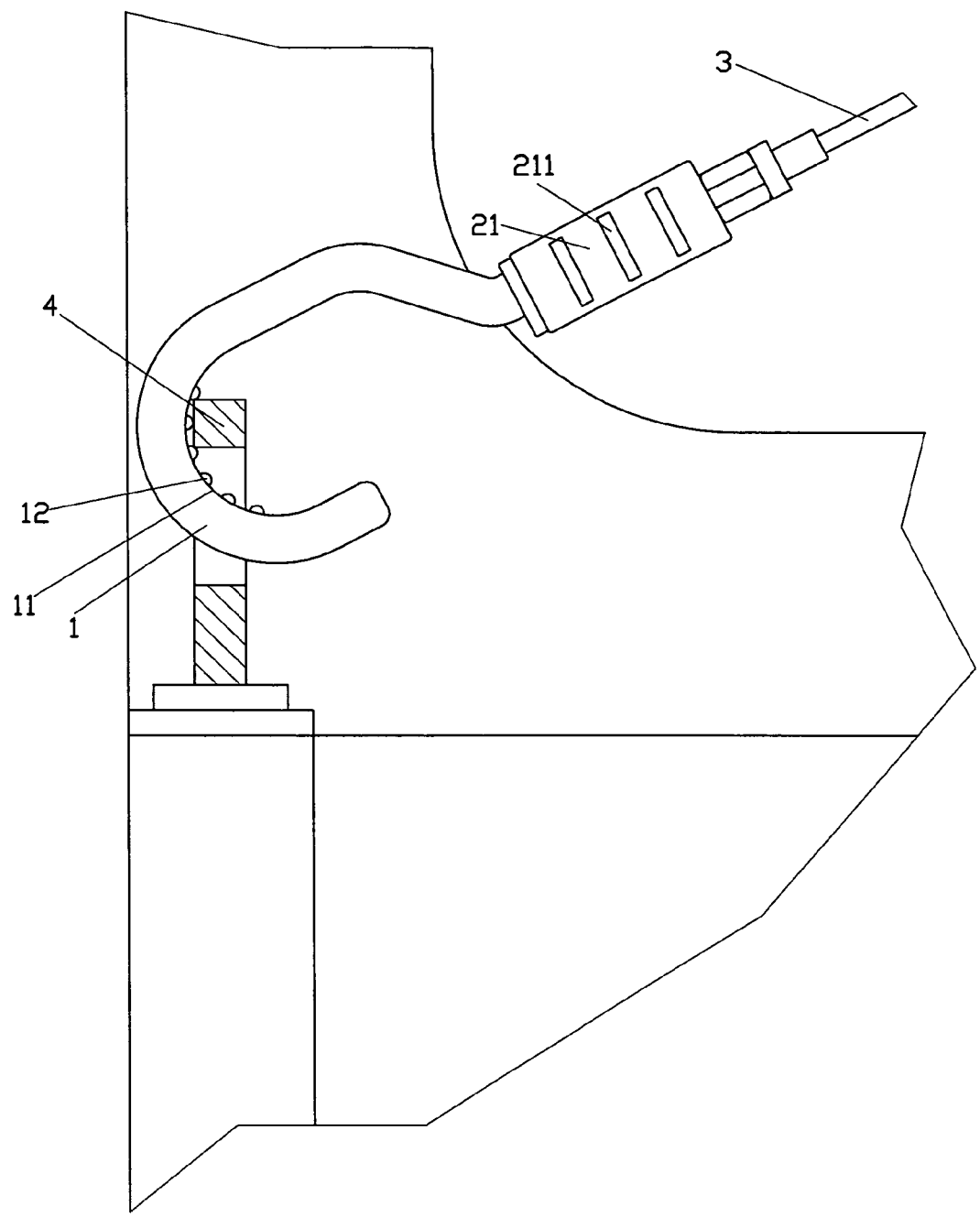
FIG. 7 is an enlarged view of FIG. 6.

FIGS. 6 and 7 show another example, the truck's body is provided with rings 4, so that the hook member 1 can be engaged with the ring 4. The protuberances 12 hold the ring 4 tightly and prevent it from disengagement.

What is claimed is:

1. A stretch cord hook comprising:
   hook members, connecting blocks and an elastic cord,
   wherein said elastic cord has its two ends secured to said connecting blocks respectively, each connecting block being integrally formed with a respective hook member,
   each hook member having an inner surface defining a curved contour, and said inner surface of each hook member being provided with a plurality of transversely extended protuberances, adjacent ones of said protuberances being spaced from each other by an arcuate portion of said inner surface extending therebetween.

2. The stretch cord hook, as recited in claim 1, wherein each said protuberance is formed with a lower portion terminating at an enlarged head extending bulbously therefrom.

3. The stretch cord hook, as recited in claim 1, wherein each said connecting block comprises two sides having a plurality of anti-slip strips formed thereon.

* * * * *